(12) United States Patent
Salter

(10) Patent No.: US 9,778,640 B2
(45) Date of Patent: Oct. 3, 2017

(54) SYSTEM-BASED CONTROL OF PROGRAMMABLE DEVICES

(71) Applicant: AZTECH ASSOCIATES INC., Kingston (CA)

(72) Inventor: Geoffrey David Vincent Salter, Kingston (CA)

(73) Assignee: Aztech Associates Inc., Kingston, Ontario (CA)

( * ) Notice: Subject to any disclaimer, the term of this patent is extended or adjusted under 35 U.S.C. 154(b) by 0 days.

(21) Appl. No.: 15/166,553

(22) Filed: May 27, 2016

(65) Prior Publication Data

US 2016/0351045 A1 Dec. 1, 2016

Related U.S. Application Data

(60) Provisional application No. 62/166,897, filed on May 27, 2015.

(51) Int. Cl.

| | |
|---|---|
| *G08B 29/00* | (2006.01) |
| *G05B 19/042* | (2006.01) |
| *H04W 4/02* | (2009.01) |
| *H04W 84/18* | (2009.01) |
| *G08B 21/04* | (2006.01) |

(52) U.S. Cl.
CPC .......... *G05B 19/042* (2013.01); *H04W 4/021* (2013.01); *G05B 2219/2642* (2013.01); *G08B 21/0469* (2013.01); *G08B 21/0484* (2013.01); *H04W 84/18* (2013.01)

(58) Field of Classification Search
CPC .......... G05B 19/042; G05B 2219/2642; G08B 21/0484; H04W 4/021; H04W 84/18; H04L 29/06; H04L 29/08576; H04L 29/0809; H04L 29/06095; H04L 29/08144; H04L 41/0213
See application file for complete search history.

(56) References Cited

U.S. PATENT DOCUMENTS

| | | | | |
|---|---|---|---|---|
| 5,577,209 | A * | 11/1996 | Boyle | G06F 21/6218 340/5.74 |
| 5,940,591 | A * | 8/1999 | Boyle | G06F 21/6218 726/3 |
| 6,212,636 | B1 * | 4/2001 | Boyle | H04L 29/06 380/255 |
| 6,272,538 | B1 * | 8/2001 | Holden | G06F 21/31 709/223 |

(Continued)

*Primary Examiner* — John A Tweel, Jr.
(74) *Attorney, Agent, or Firm* — Rosenberg, Klein & Lee

(57) ABSTRACT

A requirement exists for machine-to-machine communications between the multiple Smart Devices and Networks (SDNs) a user has without in today's environment of ubiquitous electronically enabled devices, sub-systems, systems, and networks. For example, a user's SDNs may include a multitude of network-controllable devices and networked interfaced devices within an environment of wired and wireless networks and a security system. The combined data/knowledge of these multiple SDNs can be employed to trigger actions for one or more SDNs based upon the combined states of all the SDNs. However, rather than requiring users purchase and install new systems and devices remote cloud based analytics, rule engines, etc. are employed to provide many users with smart home or office automation.

13 Claims, 8 Drawing Sheets

(56) References Cited

U.S. PATENT DOCUMENTS 8,051,181 B2 * 11/2011 Larson .............. H04L 29/12216
709/227
9,584,369 B2 * 2/2017 Yin ........................ H04L 41/12

* cited by examiner

SYSTEM-BASED CONTROL OF PROGRAMMABLE DEVICES

CROSS-REFERENCE TO RELATED APPLICATIONS

This patent application claims the benefit of priority from U.S. Provisional Patent Application 62/166,897 filed May 27, 2015 entitled "Security System Based Control of Programmable Devices", the entire contents of which are incorporated herein by reference.

FIELD OF THE INVENTION

This invention relates to electronic device automation and more particularly to the automation of network-controllable electronic devices based upon a context of their environment.

BACKGROUND OF THE INVENTION

The continued evolution of semiconductor technologies over the past thirty years have led to low cost, high volume, consumer electronic devices having capabilities and connectivity unprecedented in human history. Today, a teenager armed with a smartphone is able to browse and access content potentially from hundreds of millions of websites and billions of webpages through wireless connectivity to the Internet, exchange messages in electronic, voice, and video remotely or locally, stream high definition video, navigate essentially anywhere in the world through Global Positioning Systems (GPS), and control or obtain data from a range of other local and/or remote electronic devices ranging from activating or deactivating a residential security system to flying a drone.

These same technological advancements have also resulted in many residential homes and office buildings being increasing equipped with network-controllable devices, such as thermostats and lights. Users, through a mobile device such as a smartphone or tablet, can adjust settings of these network-controllable devices from a remote location, using a cloud server program registered on both the mobile and network-controllable devices. Using location services embedded in the mobile device, actions can also be triggered based on the user's location, such as turning on the lights just before a user enters the room. Wi-Fi APs in larger buildings help identify the unique users in each access point location. Most of these homes and buildings are also equipped with security systems which comprise keypads with "stay" and "away", or equivalently armed/disarmed modes, along with optional infrared, motion, and other sensors for movement detection and audible detection. Such electronic devices as well as those in fields ranging from health, automotive, environmental etc. have led to concepts such as Smart Devices and Networks (SDNs) of which the commonly referred to "Internet of Things" (IoT) forms part.

However, prior art SDN solutions suffer drawbacks including, for example, that the actions where triggered by user location, e.g. based upon acquired GPS location or wireless AP/base station connectivity (presence) and/or triangulation, are typically based on the location of a single PED, e.g. a smartphone. Accordingly, it becomes increasingly difficult to gauge the proper action to take when the SDNs are controlled by more than one user. For example, network-controlled lights within a residence may be programmed to a specific action, e.g. turn off, when the user is not at home, but if said user has guests or other tenants still in the house, the programmed lights will be an inconvenience. Today, the network controllable aspects of the user s residence form one SDN whilst their security system forms another SDN and they are may exploit different network infrastructure and/or common network infrastructure. However, in this scenario it would be evident that connectivity between the SDNs either as a single SDN and/or through Machine-to-Machine (M2M) communications may trigger actions based upon the combined data such that at a basic level the programmed turning off of the lights is linked to the security mode of the residence. In this manner if the user leaves and arms the security system the lights are set to their programmed state but if the user leaves and does not arm the security system then the lights are left unaffected.

Accordingly, there is a requirement for M2M communications between a user's SDNs such as their network-controllable devices and their security system, wherein the combined knowledge of these multiple SDNs is employed to trigger actions for one or more SDNs based upon the combined states of all the SDNs. Hence, within the example described supra the network-controllable device settings are established in dependence upon their settings and the current settings or mode of the security system.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to electronic device automation and more particularly to the automation of network-controllable electronic devices based upon a context of their environment.

In accordance with an embodiment of the invention there is provided a system comprising:
a security system associated with an element of infrastructure coupled to a first network and having a plurality of modes;
a plurality of network-controllable devices associated with the element of infrastructure, each coupled to a second network and having a set of operating states; wherein
a change in the mode of the security system results triggers an action with respect to a predetermined subset of the plurality of network-controllable devices.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
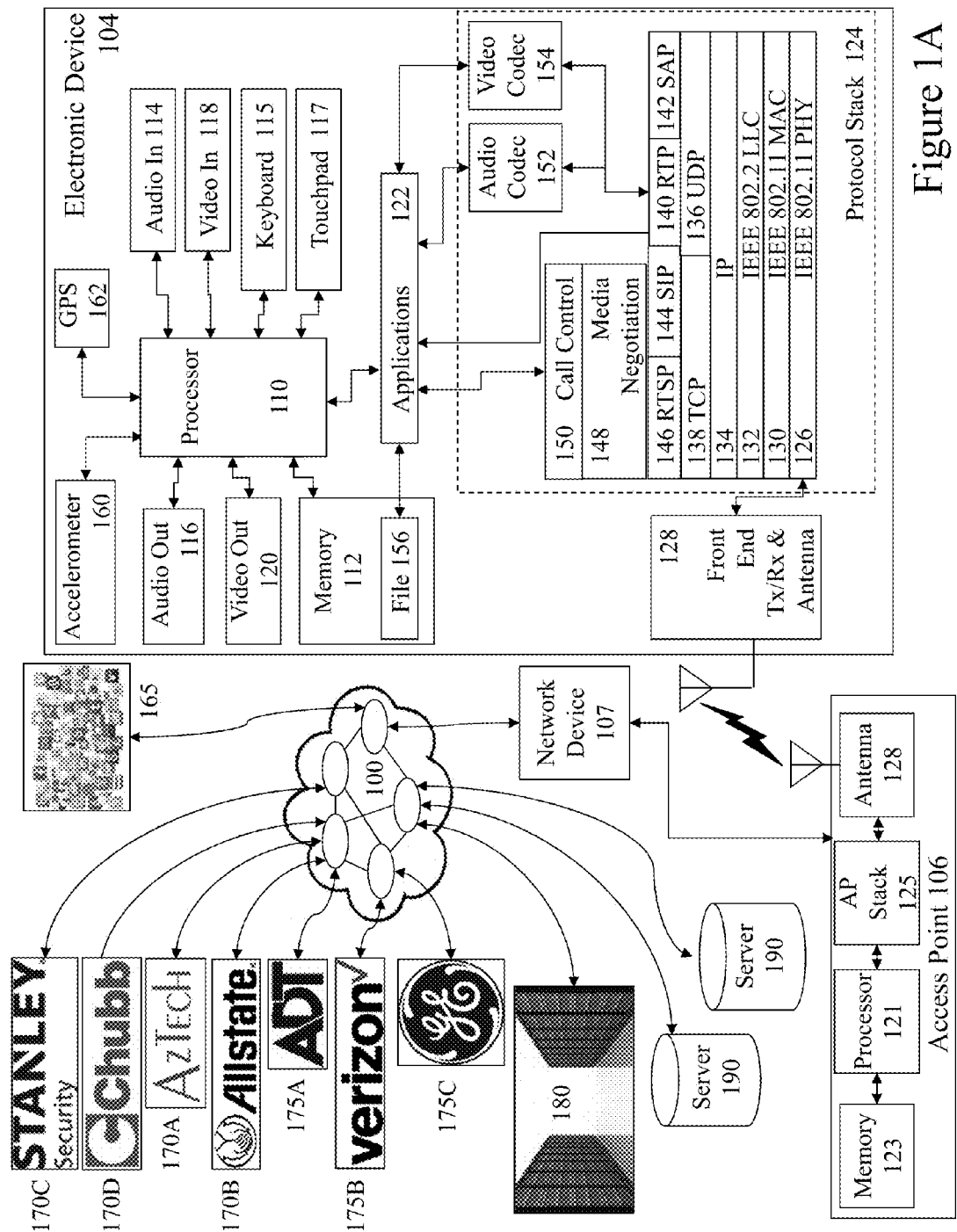
FIG. 1A depicts an electronic device and its connected environment as employed within, supporting, and providing Network Controlled Automation Applications, Software and/or Platforms (NCA-ASPs) according to embodiments of the invention.

The present invention is directed to electronic device automation and more particularly to the automation of network-controllable electronic devices based upon a context of their environment.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" or "user profile" as used herein may refer to, but is not limited to, user behavior information and/or user profile information. It may also include a user's biometric information, an estimation of the user's biometric information, or a projection/prediction of a user's biometric information derived from current and/or historical biometric information. An anonymised user profile or user information is based upon the actual user information and/or user profile but is modified such that identification of the specific user is not feasible. Obvious aspects such as name, address etc. are merely replaced with simple generic indicators of sex and a higher level geographic indicator such as town, state, country etc. Other information such as age may be replaced to one or more bands such that, for example, ages are reported simply as 0-9, 10-18, 19-25, 26-40, 40-55, and 55+ for example.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of devices, networks, etc.

"Data metrics" as used herein, and throughout this disclosure, relates to information associated with an electronic device including, but not limited to, its unique identifiable identity, manufacturer, manufacturer model, capabilities, location, status, status history, software version, firmware version, hardware version, wired interface(s) and wireless interface(s).

Reference to a "barcode" as used herein may refer to, but is not limited to, an optical machine-readable representation of data relating to an item to which it is attached and/or printed upon. A barcode employs a symbology mapping data to elements within the barcode as well as one or more other elements including, but not limited to, orientation markers, start-stop markers, quiet zones, and checksums. Such symbologies include, but are not limited to, linear symbologies, continuous symbologies, discrete symb ologies, two-width symbologies, many-width symbologies, interleaved symbologies, matrix symbologies, and two-dimensional (2D) symbologies. Examples of linear and 2D or matrix symbologies may be found listed in Wikipedia, see http://en.wikipedia.org/wiki/Barcode#Symbologies, and therein the public domain references referred to. Some barcodes, e.g. QR codes, may further support multiple variants, comprising different models, different versions, and different error correction codes that support different barcode damage levels.

Reference to "Smart Devices and/or Networks" (SDNs) as used herein may refer to, but is not limited to, one or more physical objects and/or networks to which physical objects are connected including, but not limited to, consumer devices, electronic devices, manufacturing equipment, physical infrastructure, vehicles, and buildings which are "embedded" with electronics, software, and network connectivity together with optional sensors that enables these objects to collect and exchange data via one or more networks. SDNs may include, but is not limited to, the so-called "Internet of Things" (IoT), proprietary solutions, open solutions, solutions based upon standards, solutions not based upon standards, and network controllable devices. SDNs allows objects to be sensed and controlled remotely across existing network infrastructure, either ad-hoc or planned network infrastructure for example, providing for direct integration of the physical world into computer-based systems, and resulting in at least one of improved efficiency, improved accuracy, improved economics, improved usability, and improved knowledge. Benefit. Where SDNs are augmented with sensors and actuators, these represent a subset of a more general class of cyber-physical systems, which also encompasses technologies such as smart grids, smart homes, intelligent transportation and smart cities for example. Each object within an SDN is uniquely identifiable through its embedded computing system and capable of interoperating with existing network infrastructure, including for example wireless networks, wired networks, and the Internet. An SDN may include, but not be limited to, a single network controllable device, a single network connected device (e.g. sensor), a plurality of network controllable devices, a plurality of network connected devices (e.g. a sensor network), and a combination of network controllable devices and network connected devices.

A "haptic interface" as used herein may refer to, but is not limited to, an interface and/or system that allows a user to interact with an electronic device, e.g. PED and/or FED, through bodily sensations and/or movements. A haptic interface provides tactile feedback or other bodily sensations indicating the users action with respect to the interface in order to start, stop, control, adjust, or perform an action or actions and/or process or processes upon a local and/or remote electronic device. A haptic interface may include, but is not limited to, a keypad, a keyboard, a pointer, a mouse, a touchpad, a touchscreen, a pedal, a haptic glove, and a stylus.

A "security system" as used herein may refer to, but is not limited to, a means or method by which something is secured through a system of interworking components and devices. Such components and devices may include one or more controllers, one or more haptic interfaces to grant authorized users with access, user authorization systems, locks, alarms, displays, etc. Security systems may exploit alphanumeric code access, biometric verification, keys, pass cards etc.

An "element of physical infrastructure" as used herein may refer to, but is not limited to, a discrete element or a combination of elements of physical infrastructure. Infrastructure may include, but not be limited to, structures, systems, and facilities serving a user, business, organization, country, city, area, or group of people. These may include, but not be limited to, services, facilities, and transportation. These may include, but not be limited to, roads, buildings, residential dwellings, shopping malls, hospitals, commercial units, manufacturing locations, warehouses, bridges, tunnels, water supply, sewers, electrical grids, and telecommunications facilities—equipment. These may include, but not be limited to, physical components of discrete or interrelated nature providing commodities and services to enable, sustain, or enhance societal living conditions.

Referring to FIG. 1 there is depicted an infrastructure schematic supporting communications to a Network 100 and therein Remote Servers 190, Electronic Devices 104, etc. as Network Controlled Automation Applications, Software and/or Platforms (NCA-ASP) according to an embodiment or embodiments of the invention. Accordingly, an Electronic Device 104 is connected to Network 100 which is then coupled to a Remote Central Exchange 180 which communicates with the remainder of a telecommunication service providers network via Network 100 and/or other networks which may include for example long-haul OC-48/OC-192 backbone elements, an OC-48 wide area network (WAN), a Passive Optical Network, and a Wireless Link. The Remote Central Exchange 180 is connected via Network 100 and/or other networks to local, regional, and international exchanges (not shown for clarity). Electronic Device 104 is connected to Network 100 via an Access Point 106 and Network Device 107. The wireless communications between Electronic Device 104 and Access Point 106 may be through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.10, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices such as Electronic Device 104 may communicate directly to Access Point 106 or it may form an association with another electronic device through standards such as IEEE 802.15 and Bluetooth as well in an ad-hoc manner to communicate with the Access Point 106.

Access Point 106 is depicted as connected to Network Device 107 and therein Network 100 via a wired interface which may be through one or more wired communications standards such as, including, but not limited to, DSL, Dial-Up, DOCSIS, Ethernet, G.hn, ISDN, MoCA, PON, and Power line communication (PLC) which may or may not be routed through a router (not shown for clarity). Alternatively, Electronic Device 104 may be connected to Access Point 106 via a wired connection and Access Point (AP) 106 connected to Network Device 107 via a wireless interface. Also connected to the Network 100 are:

Social Networks (SOCNETS) 165;
Software provider 170A, e.g. Aztech™;
Insurance service provider 170B, e.g. AllState™ Insurance;
First and second security device providers 170C and 170D respectively, e.g. Stanley™ and Chubb™;
Security service provider 175A, e.g. ADT™;
Telecommunications service provider 175B, e.g. Verizon™; and
Original equipment manufacturer (OEM) 175C, e.g. General Electric™.

Also connected to Network 100 are Servers 190 which together with others, not shown for clarity. Servers 190 may host according to embodiments of the inventions multiple services associated with a provider of Electronic Device Automation software tools, a provider of Electronic Device Automation Applications, Software, and/or Platforms (EDA-ASPs); a provider of a SOCNET or Social Media (SOME) exploiting EDA-ASP features; a provider of a SOCNET and/or SOME not exploiting EDA-ASP features; a provider of services to PEDs and/or FEDs; a provider of one or more aspects of wired and/or wireless communications; license databases; content databases; image databases; content libraries; customer databases; product databases; software databases; software patch databases; open license software databases; websites; and software applications for download to or access by FEDs and/or PEDs exploiting and/or hosting EDA-ASP features. Servers 190 may also host, for example, other Internet based or web portal based services such as search engines, financial services, third party applications, telecommunications services (e.g. VoIP or content streaming), and other Internet based services.

Accordingly, a user may exploit Electronic Device 104 to access Servers 190 to perform an operation such as accessing/downloading an application which provides EDA-ASP features according to embodiments of the invention; execute an application already installed providing EDA-ASP features; execute a web based application providing EDA-ASP features; or access content. Similarly, a user may undertake such actions or others exploiting embodiments of the invention exploiting a PED or FED within a user group associated with one or more cellular Access Points (APs) and/or one or more short range wireless, e.g. Wi-Fi, nodes (also APs).

The Electronic Device 104 includes one or more microprocessors 110 and a memory 112 coupled to processor(s) 110. AP 106 also includes one or more processors 121 and a memory 123 coupled to processor(s) 110. A non-exhaustive list of examples for any of processors 110 and 121 includes a central processing unit (CPU), a digital signal processor (DSP), a reduced instruction set computer (RISC), a complex instruction set computer (CISC) and the like. Furthermore, any of microprocessors 110 and 121 may be part of application specific integrated circuits (ASICs) or may be a part of application specific standard products (ASSPs). A non-exhaustive list of examples for memories 112 and 123 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like. The Electronic Device 104 may include, in addition to the one or more microprocessors 110, dedicated processors such as graphic acceleration, network interface adaptors, etc.

Electronic Device 104 may include an audio input element 114, for example a microphone, and an audio output element 116, for example, a speaker, coupled to any of processors 110. Electronic Device 104 may include a video input element 118, for example, a video camera or camera, and a video output element 120, for example an LCD display, coupled to any of processors 110. Electronic Device 104 may include a keyboard 115 and touchpad 117 which may for example be a physical keyboard and touchpad allowing the user to enter content or select functions within one of more applications 122. Alternatively, the keyboard 115 and touchpad 117 may be predetermined regions of a touch sensitive element forming part of the display within the Electronic Device 104.Optionally, the Electronic Device 104 may support other haptic interfaces. The one or more applications 122 that are typically stored in memory 112 and are executable by any combination of processors 110. Electronic Device 104 also includes accelerometer 160 providing three-dimensional motion input to the process 110 and GPS 162 which provides geographical location information to processor 110.

Electronic Device 104 includes a protocol stack 124 and AP 106 includes a communication stack 125. Within system 100 protocol stack 124 is shown as IEEE 802.11 protocol stack but alternatively may exploit other protocol stacks such as an Internet Engineering Task Force (IETF) multimedia protocol stack for example. Likewise, AP stack 125 exploits a protocol stack but is not expanded for clarity. Elements of protocol stack 124 and AP stack 125 may be implemented in any combination of software, firmware and/or hardware. Protocol stack 124 includes an IEEE 802.11-compatible PHY module 126 that is coupled to one or more Front-End Tx/Rx & Antenna 128, an IEEE 802.11-compatible MAC module 130 coupled to an IEEE 802.2-compatible LLC module 132. Protocol stack 124 includes a network layer IP module 134, a transport layer User Datagram Protocol (UDP) module 136 and a transport layer Transmission Control Protocol (TCP) module 138.

Protocol stack 124 also includes a session layer Real Time Transport Protocol (RTP) module 140, a Session Announcement Protocol (SAP) module 142, a Session Initiation Protocol (SIP) module 144 and a Real Time Streaming Protocol (RTSP) module 146. Protocol stack 124 includes a presentation layer media negotiation module 148, a call control module 150, one or more audio codecs 152 and one or more video codecs 154. Applications 122 may be able to create maintain and/or terminate communication sessions with any of devices 107 by way of AP 106. Typically, applications 122 may activate any of the SAP, SIP, RTSP, media negotiation and call control modules for that purpose. Typically, information may propagate from the SAP, SIP, RTSP, media negotiation and call control modules to PHY module 126 through TCP module 138, IP module 134, LLC module 132 and MAC module 130.

It would be apparent to one skilled in the art that elements of the Electronic Device 104 may also be implemented within the AP 106 including but not limited to one or more elements of the protocol stack 124, including for example an IEEE 802.11-compatible PHY module, an IEEE 802.11-compatible MAC module, and an IEEE 802.2-compatible LLC module 132. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by Electronic Device 104 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.10, IMT-1000, DSL, Dial-Up, DOCSIS, Ethernet, G.hn, ISDN, MoCA, PON, and Power line communication (PLC).

According to embodiments of the invention described below and depicted in FIGS. 1A to 7 respectively an existing SDN, e.g. a security system and its associated hardware, are attached to an interface device establishing communications with one or more remotely based services accessible via the Internet (commonly referred to a cloud based services) that manage one or more SDNs. With the modification, rules and policies can be defined to change the settings of one or more SDNs based on the status of one or more other SDNs. Within the example supra, if the security system is set to "away" mode then the other SDNs, including discrete network-controllable devices, receive notification of the security system's status, and trigger programmed actions for the SDNs which include this security system status in their decision making process. The defined rules and policies may, therefore, trigger one or more SDNs to change their settings based on the status of the security system status change. In further examples of this embodiment of an EDA-ASP according to an embodiment of the invention, the armed/disarmed status can be employed within an SDN to put the thermostat into energy saving or normal modes. In further examples of this embodiment, optional motion or presence sensors coupled to the security system, such as infrared sensors, may also trigger changes to the SDNs in specific areas of the house, such as audio systems, home entertainment systems, lights etc. In further examples of this embodiment, a building equipped with electronic locks may be automatically triggered to set them to a locked position when the security system is actively armed. Rules and policies can also be triggered based upon with network-controllable device (SDN) the status change is associated with such that, for example, depending on which arming point (such as a specifically located keypad) is employed different outcomes result for the SDNs. For example, a keypad located in a residential garage used to unarm a security system may result in different SDN triggers for their associated network-controllable devices than would arise if the unarming occurred at a front door keypad, back door keypad, or remotely.

In a further example of this embodiment of the invention, a doorbell-like switch that triggers the software to act like it was a security system, i.e. change "armed"/"unarmed" status, may be employed. For buildings without an alarm system the rules may be established based upon a geofence associated with predetermined PEDs to establish home/away status of an individual or group of individuals for triggering actions. Within the preceding and following descriptions and depictions of embodiments of the invention the concepts are presented and discussed with respect to a first SDN, a residential security system, and one or more other SDNs. However, such exemplary embodiments are not to be construed as limiting the application of embodiments of the invention and the scope of embodiments of the invention shall be construed solely by the claims of this patent. Embodiments of the invention may be employed within applications including, but not limited to, home automation, office automation, building automation, manufacturing, entertainment, sports, transportation, medical, education, security, telecommunications, and combinations thereof.

It should also be noted that an SDN may include, but is not limited to, a single network controllable device, a single networked connected device, a plurality of network controllable devices associated with an object, a plurality of network connected devices associated with an object, a combination of network controllable devices and network connected devices associated with an object, a plurality of network controllable devices associated with multiple objects in one or more locations, a plurality of network connected devices associated with multiple objects in one or more locations, and a combination of network controllable devices and network connected devices associated with multiple objects in one or more locations.

Figure 1B:
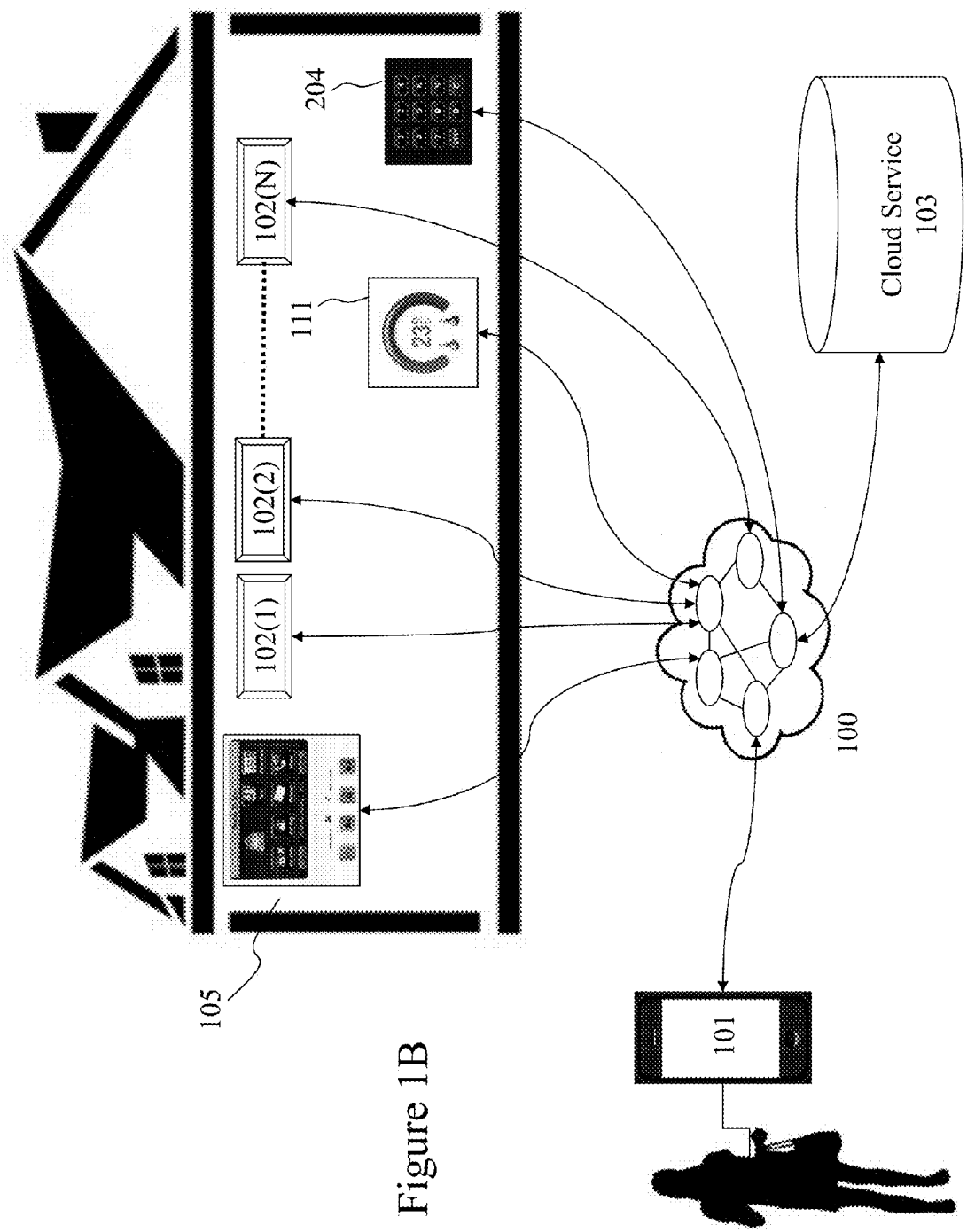
FIG. 1B depicts an example of Machine-to-Machine (M2M) communication between a user s portable electronic device and two Smart Devices and Networks (SDNs) associated with the user according to an embodiment of the invention wherein the SDNs are the user's residential security system and residential network controllable devices.

Now referring to FIG. 1B there is depicted an example of Machine-to-Machine (M2M) communication between a user's portable electronic device and two Smart Devices and Networks (SDNs) associated with the user according to an embodiment of the invention wherein the SDNs are the user s residential security system and residential network controllable devices. A PED 101 associated with a user is coupled to a Cloud Service 103 via Network 100 via the Key Pad 104 or of the Security System Panel 105. Using, for example, the GPS embedded in the user's PED 101, which communicates with the security system's Cloud Service 103, the location of the user can be used to trigger the Security System 105 to determine which mode, such as "armed" or "unarmed", to use. Particular attention needs to be paid in order to not accidently trigger an unarmed condition. Furthermore, the mobile device can act as an additional Key Pad 204 for the security system irrespective of its physical proximity to the building. The plurality of network-controllable Devices 102.1 . . . 102.N are coupled to the Cloud Service 103, and communicate with the Cloud Service 103 of the Security System 105, wherein a change in status or mode in the Security System 105 triggers communication from the Cloud Service 103 to the network-controllable Devices 102.1 . . . 102.N, whereby the network-controllable Devices 102.1 . . . 102.N take a pre-programmed action, such as turning on or off, based upon at least the status or mode of the Security System 105. A specific type of network-controllable device in such an embodiment is a Thermostat 111, which controls the Heating, Ventilation and Air Conditioning (HVAC) of the premises.

Figure 2:
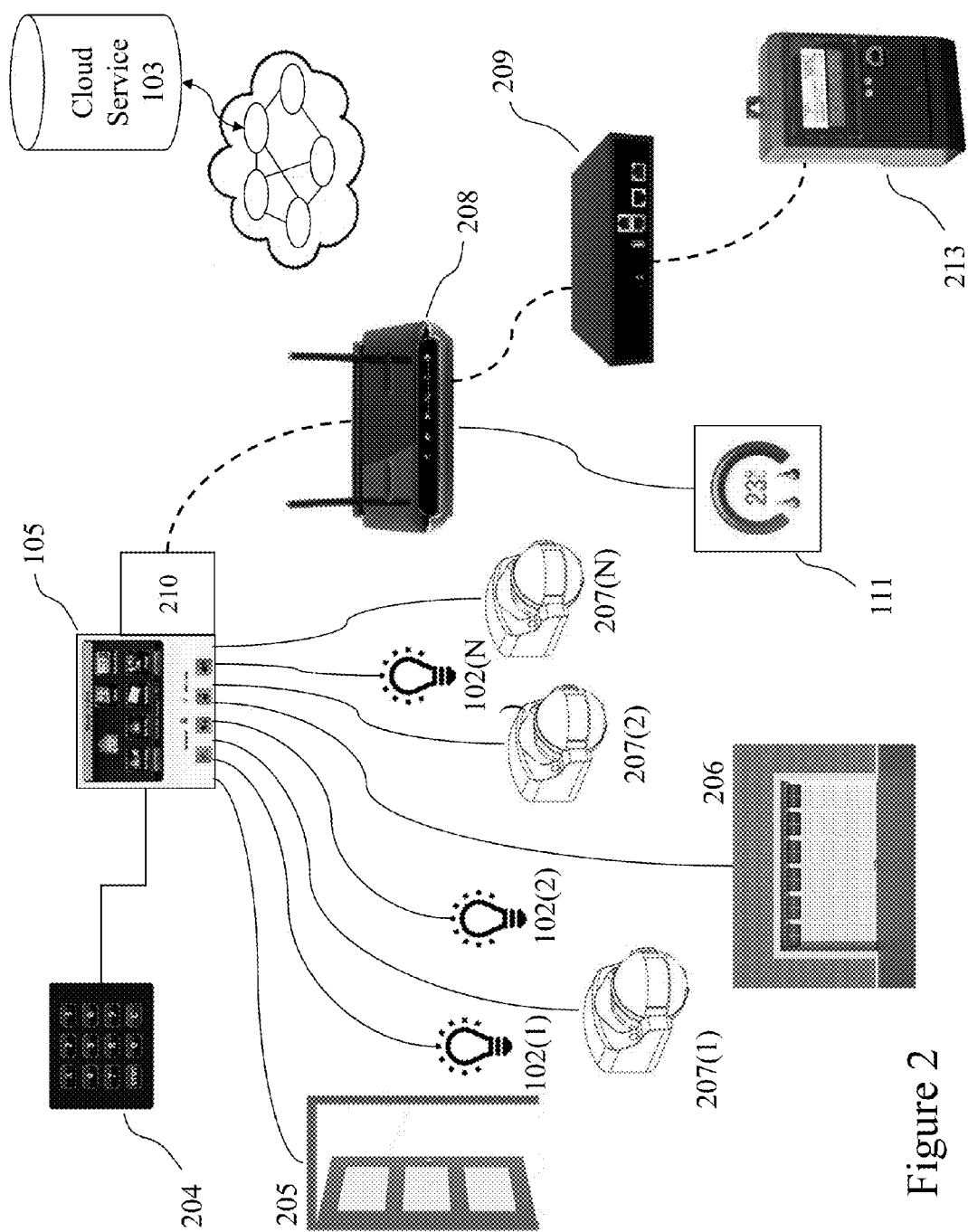
FIG. 2 depicts the example of Machine-to-Machine (M2M) communication between PED and SDNs presented in FIG. 1B with respect to an embodiment of the invention wherein the SDN relating to the residential security system now incorporates motion sensors.

Referring to FIG. 2 there is depicted an example of Machine-to-Machine (M2M) communication between PED and SDNs presented in FIG. 1B with respect to an embodiment of the invention wherein the SDN relating to the residential security system now incorporates motion sensors. The Security System 105 is now coupled to an Interface Device 210 for communicating with a Gateway 208 using proprietary communications or communications to an automation standard, such as a Home Automation Network (HAN) operating according to C-Bus, EnOcean, Insteon, KNX, Thread, xPL, Zigbee or Z-Wave protocols for example. These communications connect to the Cloud Service 103 to enable control of one or more network-controllable Devices 102.1 ... 102.N via the network. The Security System 105 can also be armed or disarmed via the Key Pad 204, and is coupled to one or more motion Sensors 207.1 ... 207.N. Based on the point of entry, the motion Sensors 207.1 ... 207.N which are activated correlate to a preprogrammed trigger of select network-controllable Devices 102.1 ... 102.N. For example, entrance via Door 205 activates motion Sensor 207.1, which triggers network-controllable Device 102.1, whereas entrance via Garage Door 206 activates motion Sensor 207.2, triggering network-controllable Device 102.2. A specific application for this HAN being where there is a Smart Meter 213 which is capable of providing energy consumption and price and/or tier information. An energy display or smart meter Gateway Device 209 can take that energy consumption related data and pricing and via the Gateway 208 to allow the Cloud Service 103 to make network controllable Devices 102.1 ... 102.N or thermostats 111 change lighting levels or temperatures to some rule or algorithm based function based upon time, tier price or demand.

Figure 3:
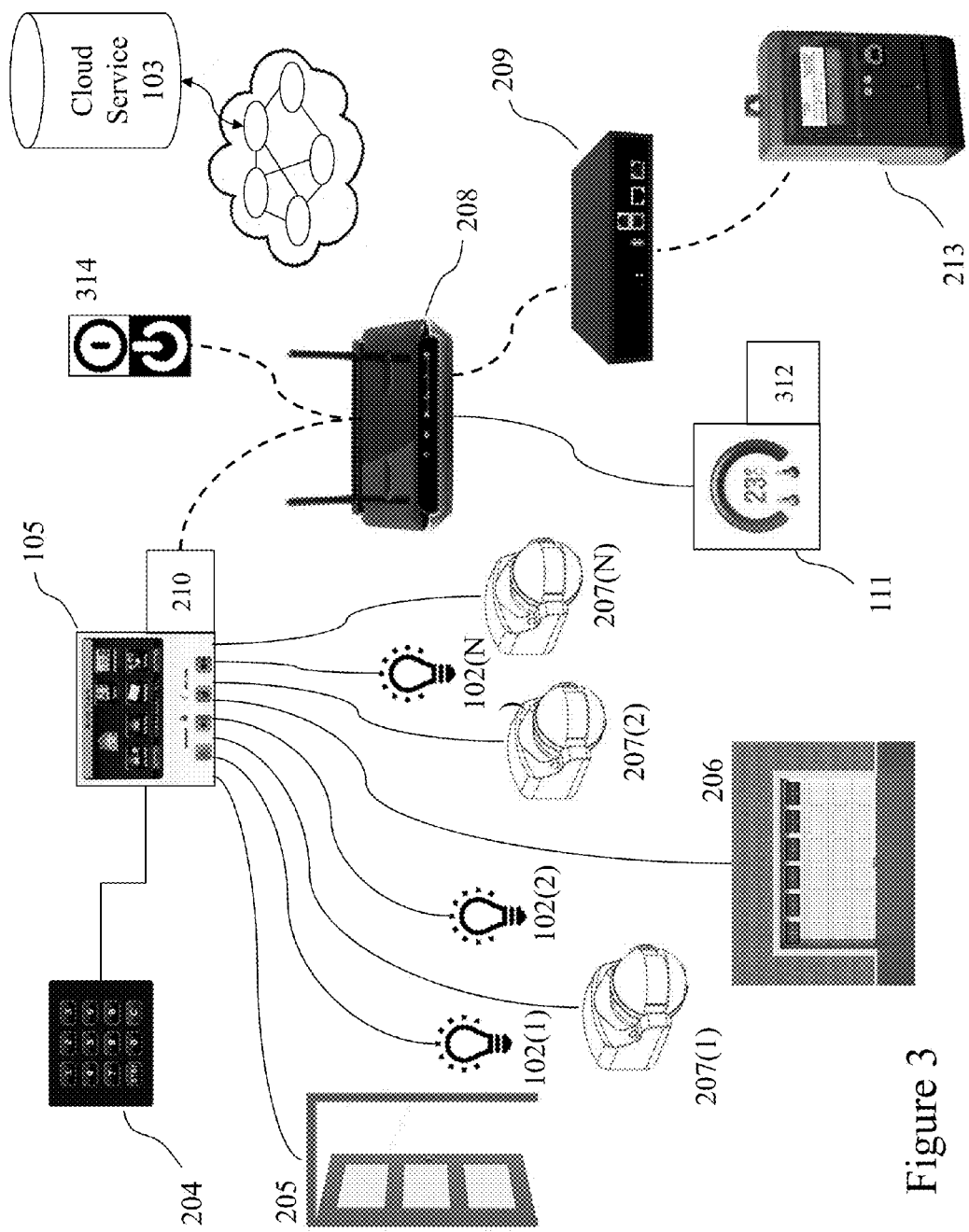
FIG. 3 depicts the example of Machine-to-Machine (M2M) communication between PED and SDNs presented in FIGS. 1B and 2 with respect to an embodiment of the invention wherein the SDN relating to the residential security system now incorporates a button triggering the security system to simulate armed and disarmed modes.

Now referring to FIG. 3 there is depicted a further example of Machine-to-Machine (M2M) communication between PED and SDNs presented in FIGS. 1B and 2 with respect to an embodiment of the invention wherein the SDN relating to the residential security system now incorporates a Button 314 triggering the security system to simulate armed and disarmed modes where a building may not be equipped with a Security System 105. The Security System 105 is coupled to an Interface Device 210 for communicating with a Gateway 208 using proprietary or standard HAN communications to connect to the Cloud Service 103 to enable control of one or more network-controllable Devices 102.1 ... 102.N via a Cloud Service 103. The Security System 105 can also be armed or disarmed via the Key Pad 204, and is coupled to one or more motion Sensors 207.1 ... 207.N. Based upon the point of entry, the motion Sensors 207.1 ... 207.N which are activated correlate to a preprogrammed trigger of selectnetwork-controllable Devices 102.1 ... 102.N. For example, entrance via Door 205 activates motion Sensor 207.1, which triggers network-controllable Device 102.1, whereas entrance via Garage Door 206 activates motion Sensor 207.2, triggering network-controllable Device 102.2. A specific application for this HAN is where there is a Smart Meter 213 which is capable of providing energy consumption and price and/or tier information. An energy display or smart meter Gateway Device 209 can take that energy consumption related data and pricing and via the Gateway 208 to allow the Cloud Service 103 to make network controllable Devices 102.1 ... 102.N or Thermostats 111 change lighting levels or temperatures to some rule or algorithm based function based upon time, tier price or demand as well as Security System 105 status etc. If the Thermostat 111 is network-controlled, the controls can be changed via the Cloud Service 103. Optionally, if the Thermostat 111 is an older model without network capabilities, a Thermostat Manager 312 is coupled to the Thermostat 111. The Thermostat Manager 312 is network-controlled and can bypass the Thermostat 111 to control the temperature to a more energy-saving level without requiring a complete retrofit of the Thermostat 111. In some instances, maintaining a "legacy" Thermostat 111 may aid an elderly person who is familiar with their Thermostat 111 and may be easily comprehend a new Thermostat 111.

In the instance that the HVAC system consists of multiple zones and the use of motion Sensors 207.1 ... 207.N that are nominally only part of the security system via the Cloud Service 103 together with a set of rules can be used to identify zones of motion or occupancy and adjust HVAC settings for those locations where "security" zones map to HVAC zones. Optionally, in larger buildings linking this Cloud Service 103, a rules database and/or rule generating server to a network connected room reservation or calendar system, for example, will allow pre-heating or cooling of specialty rooms (conference rooms, auditoriums) based on planned use versus simply being on all the time based upon day of the week or other simplistic rules. The aforementioned motion Sensors 207.1 ... 207.N can override the schedule/reservation by actual presence, and can restore the room to "unoccupied" via proper rules even before a scheduled end to further save energy. Optionally, the Cloud Service 103 can be coupled to external weather services to aid programmed temperature settings, such as on weekends or holidays, to keep the temperature in an optimal energy-saving mode.

Further, additional sensors such as infrared sensors may provide occupancy information even in the absence of motion, e.g. individual(s) sitting in chair, lounging on floor, sleeping etc. Similarly, acoustic sensors may be incorporated. Further, audiovisual entertainment systems and other devices can be also linked through the Cloud Service 103 such that when a determination of a user sleeping is made the sound level may be reduced in combination with lighting levels etc.

It becomes apparent that the motion Sensors 207.1 ... 207.N along with providing their main security purpose when multi-purposed as occupancy sensors can not only trigger energy saving rules but can in the case of eldercare or disabled persons indicate the "OK" status of someone moving around and not constrained to any part of a building, or not moving at all. Their motion awareness combined with normal "signatures" of energy use 213 to 209 to 208 can enable offsite care-givers. Further, linking multiple sensor types together with acoustic sensors (e.g. microphone) can be used to increase the knowledge based services provided to the elderly, hospitalized etc. without increasing loading on personnel such as care works, nurses, etc. according to the environment. These associations of sensors and systems through embodiments of the invention may also increase elderly care or medical care in the home by associating rules through an externally based database and/or server to the sensors and/or systems within a residence such that enhanced knowledge based determinations of needs, help, emergency services etc. can be made. In instances wherein the linking of a system to an automation network also permits the transmission of data to a system then the Cloud Service 103 may employ an existing audiovisual system or audio system to communicate to occupants etc. Such linking of services through their existing network interfaces or through augmenting them with network interfaces allows for loved one, health care workers, etc. to achieve their sought level of knowledge and/or monitoring in a manner that is not intrusive and avoids replacement of one or more existing systems within the residence, commercial environment, etc.

Figure 4:
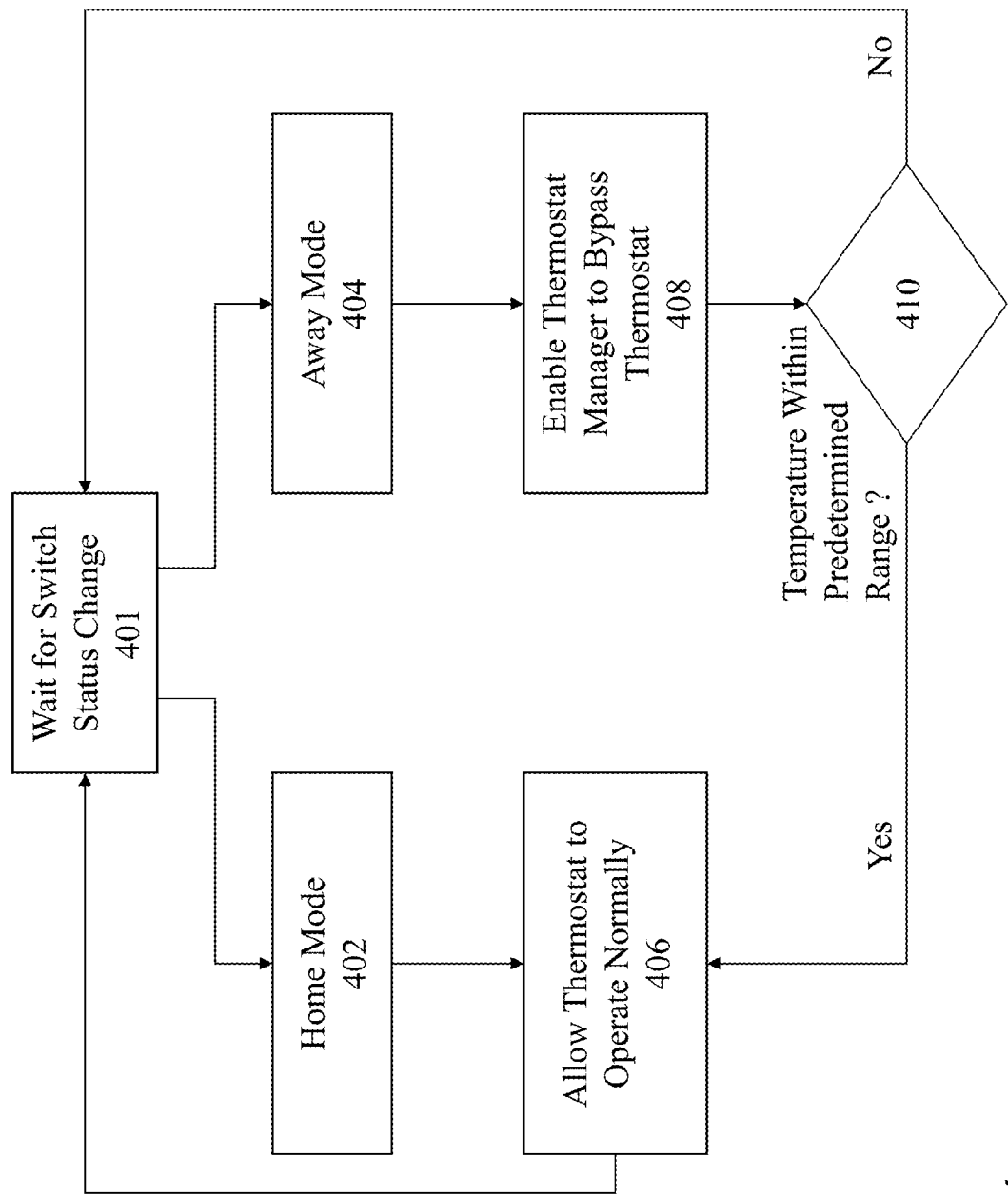
FIG. 4 depicts an exemplary flow chart for a switch within a HVAC configuration coupled to a thermostat manager according to an embodiment of the invention.

Referring to FIG. 4 there is depicted an exemplary flow chart for a switch within a HVAC configuration coupled to a thermostat manager according to an embodiment of the invention. As noted supra for buildings not equipped with a security system, a switch is installed to simulate a security system's arm or disarm modes or alternatively the Cloud Service 103 determines the occupancy level and establishes the arm/disarm mode that is then communicated to the other network interfaced systems. A change in switch status at step 401 triggers actions for the thermostat or other network-controllable devices. If the switch is determined to be in home mode in step 402, the thermostat continues to operate normally and the process loops back to step 401. If the switch of status becomes away mode in step 404, the thermostat manager is enabled in step 408 which bypasses the thermostat to trigger changes to temperature actions. If the temperature is goes outside a predetermined range as determined in step 410, the thermostat manager will discontinue its bypass of the thermostat and allow the thermostat to operate normally returning the process to step 406 and therein step 401. If the temperature is within the allowed range 410, the thermostat manager will continue to operate until either a switch status change is detected in step 401, or until the temperature is within range and the process proceeds from step 410 to step 406. This predetermined range may be characterised as a "safe" range and is typically not the normal range of the home mode. Accordingly, the away mode limits may be set outside the "normal" range in order that the energy consumption is lowered such that for example a typical 23° C. threshold for engaging air conditioning and 19° C. threshold for engaging heating may be extended to 28° C. and 15° C. respectively, for example.

Figure 5:
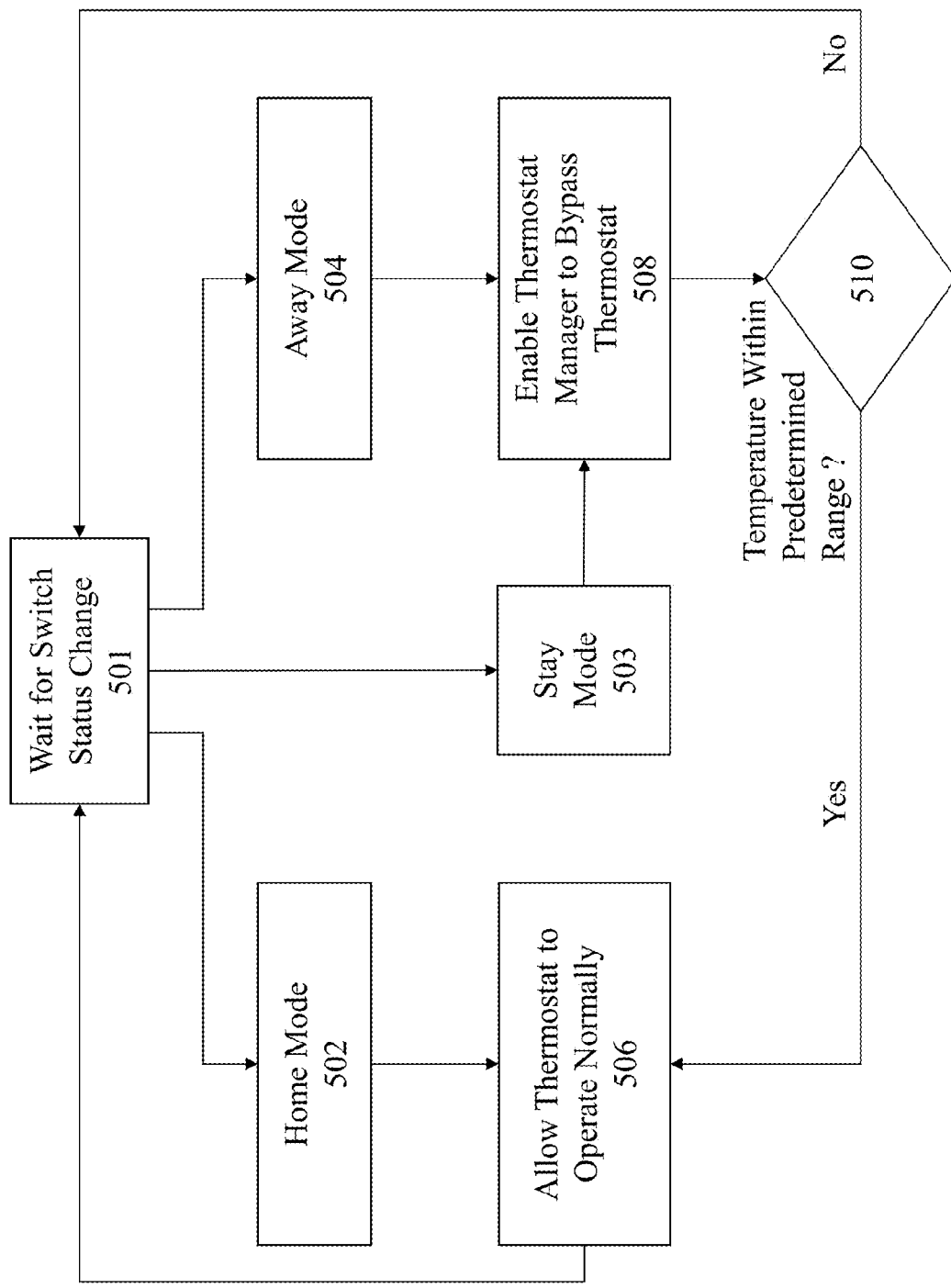
FIG. 5 depicts an exemplary flow chart for a security system status change triggering temperature rules relating to a HVAC system according to an embodiment of the invention.

Referring to FIG. 5 there is depicted an exemplary flow chart for a security system status change triggering temperature rules relating to a HVAC system according to an embodiment of the invention. When a security system changes its status as detected in step 501, the new status triggers events for thermostats or other network-controllable devices. If the security system is in home mode as determined in step 502, the thermostat will continue to operate normally until a status change is noted. In both away mode and stay mode as determined in steps 504 and 503 respectively, the thermostat manager is enabled at step 508 which bypasses the thermostat to trigger temperature adjustment actions. If the temperature is outside a predetermined range as established in step 510, the thermostat manager will discontinue the bypass and allow the thermostat to operate normally. If the temperature is within the allowed range in step 510, the thermostat manager will continue bypassing the thermostat until a system status is changed or until the temperature returns to range. It would be evident that where the property has an air conditioning and a heating system that the thermostat status and security system status may trigger one or both according to the action required.

Figure 6:
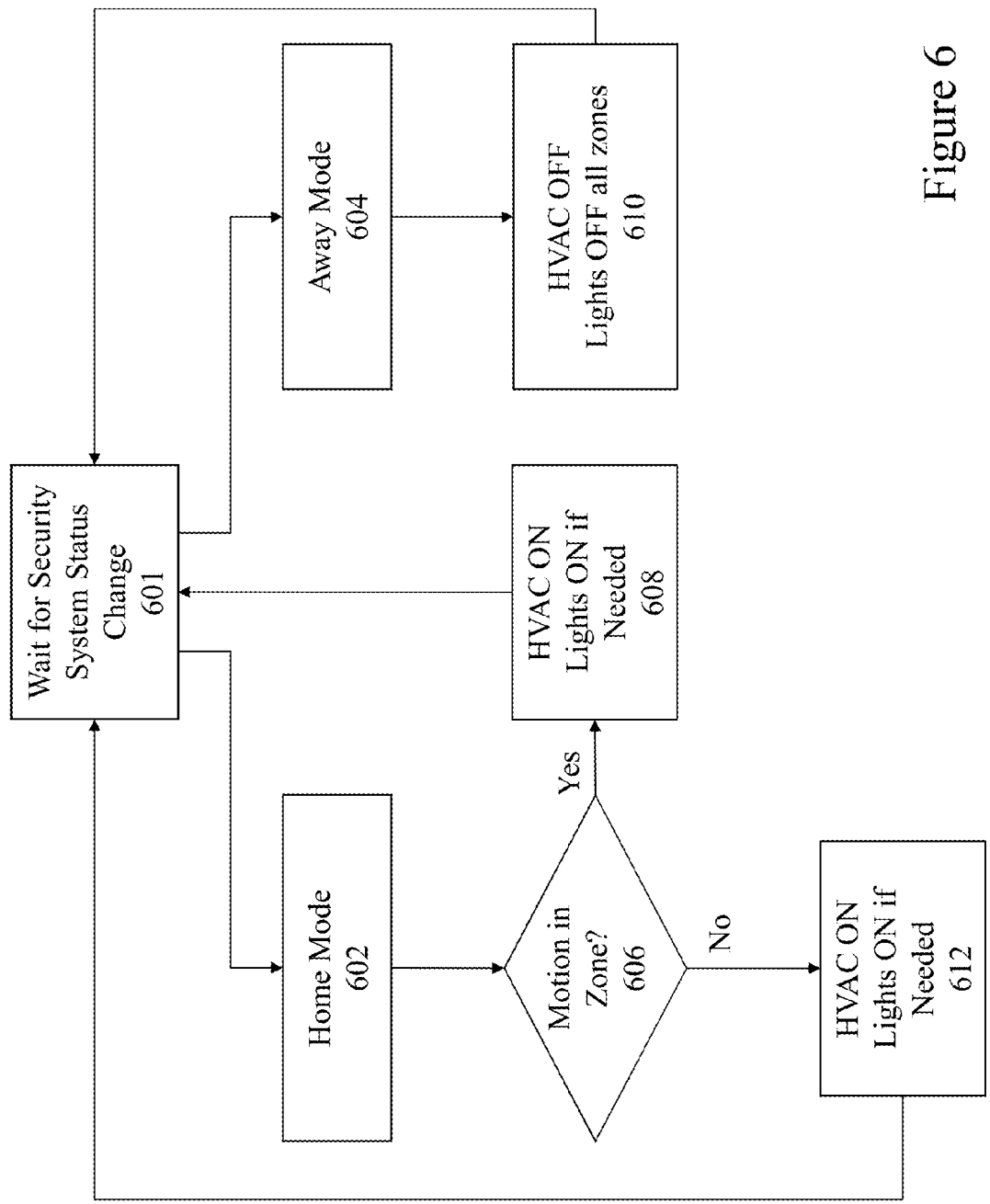
FIG. 6 depicts an exemplary flow chart for programmed settings of a security panel based on the status of the security system and optional motion sensors according to an embodiment of the invention.

Now referring to FIG. 6 there is depicted an exemplary flow chart for programmed settings of a security panel based on the status of the security system and optional motion sensors according to an embodiment of the invention. When a security system status change is detected in step 601 this triggers actions of thermostats and/or other network-controllable devices. When in home mode as established in step 602, the system waits to detect motion at step 606 before triggering any actions. If motion is detected in a zone, the lights and HVAC will turn on in step 608 within that zone until a system status change is noted. If no motion is detected in the zone, HVAC and lights will remain off as established in step 612 within the zone until a change in status is noted. In away mode in step 604, HVAC and lights remain off in all zones as established in step 610 until a change in status is noted.

Figure 7:
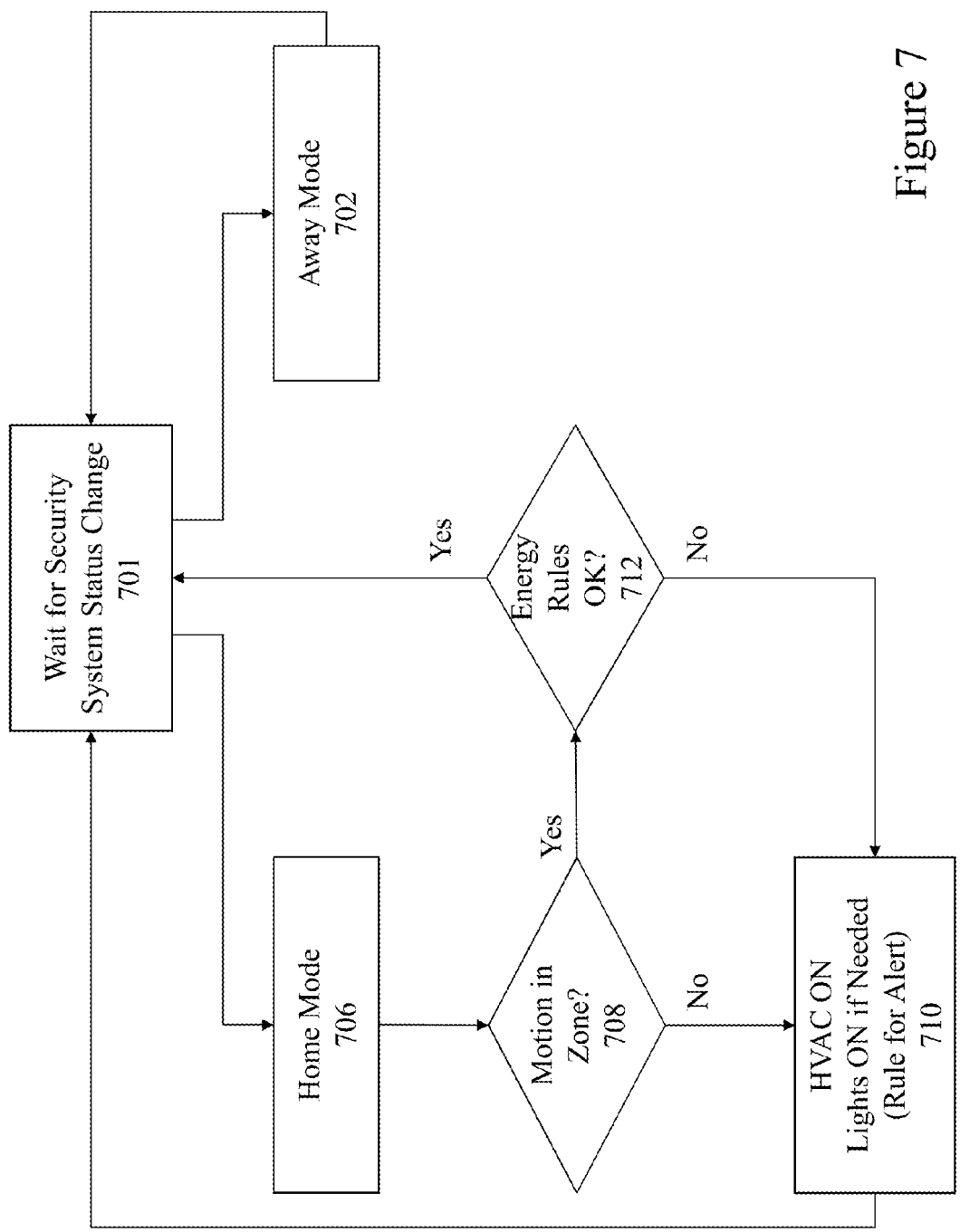
FIG. 7 depicts an exemplary flow chart for a switch or security panel settings based on a specialty care scenario, such as disabled or elderly care, within an embodiment of the invention.

Referring to FIG. 7 an exemplary flow chart is depicted for a switch or security panel settings based on a specialty care scenario, such as disabled or elderly care, within an embodiment of the invention. A change in the status of a security system established at step 701 will trigger actions to communicate with a cloud-server based on predetermined rules of motion and energy. If the system is in away mode in step 702, no energy or motion rules will apply, and thus the triggers will wait for a change in security system status at step 701. If in home mode at step 706, motion sensors will detect if any motion exists in step 708. If no motion exists, an alert is sent in step 710 for a possible accident or emergency. For example, if an elderly person gets up routinely at a certain time, a rule could be established that if no motion occurs within a predetermined time, e.g. two hours after that time, an alert will be sent. If motion is detected, energy rules are applied in step 712, such as thermostat or appliance changes. If the energy rules are okay, the system continues until a change in status occurs by looping back to step 701. If the energy rules are not okay, an alert is sent in step 710. For example, if the elderly person also turns on the TV and the coffee maker each morning at a certain time, then if these energy rules are not followed, an alert would be sent.

The embodiments of the invention described and depicted with respect to FIGS. 1B to 7 may exploit Electronic Devices 104 wherein the design, construction and features of the Electronic Device 104 is established in dependence upon factors including, but not limited to, the functionality, manufacturer specifications, wired and/or wireless interfaces, national standards, industry standards, cost, etc. These Electronic Devices 104 may communicate to one or more remote servers via a network suchas Network 200 wherein the remote servers may be associated with a variety of service providers, third party providers, other users, friends, family, etc. For example, considering FIG. 1 the Servers 190 connected to the Network 200 may be associated with one or more of the following as depicted:

Social Networks (SOCNETS) 165;
Software provider 170A, e.g. Aztech™;
Insurance service provider 170B, e.g. AllState™ Insurance;
First and second security device providers 170C and 170D respectively, e.g. Stanley™ and Chubb™;
Security service provider 175A, e.g. ADT™;
Telecommunications service provider 175B, e.g. Verizon™; and
OEM 175C, e.g. General Electric™.

Accordingly, considering these within the context of the invention these may provide and/or support the following inputs and/or outputs to the Cloud Service 103 and the various SNDs associated with a user of Network Controlled Automation Applications, Software and/or Platforms (NCA-ASPs) according to embodiments of the invention.

Social Networks (SOCNETS) 165 may allow an NCA-ASP according to an embodiment of the invention to post alerts, alarms, etc., update status information, access data, and crowd source data. In some instances, the data posted may include data from a profile of a user or in other instances the user may be anonymised.

Software provider 170A, e.g. Aztech™ may remotely update and upgrade via an NCA-ASP according to an embodiment of the invention SNDs and Electronic Devices 104 that are remote and/or local to the NCA-ASP associated with a user. Further, fault detections in SNDs and/or Electronic Devices 104 may be communicated to the software provider and therein addressed individually or in part or all of the user base through a software patch or patches until an upgrade is available. The software provider may also enable/disable some or all features of a NCA-ASP according to an embodiment of the invention based upon factors such as, for example, subscription level, subscription status, Government regulations within a jurisdiction, and status of the NCA-ASP.

Insurance service provider 170B, e.g. AllState™ Insurance may access crowd analytics relating to NCA-ASPs according to an embodiment of the invention in order to establish frequency of events by jurisdiction, etc. wherein the analytics relating to settings, events, alarms, controls etc. of SNDs and/or Electronic Devices 104 are associated with anonymised profiles of the user to whom the SNDs and/or Electronic Devices 104 relate.

First and second security device providers 170C and 170D respectively, e.g. Stanley™ and Chubb™ may similarly to software provider 170A provide remote updates and upgrades via an NCA-ASP to SNDs and Electronic Devices 104 they have manufactured.

Security service provider 175A, e.g. ADT™ may provide similar updates and upgrades to their security systems and sensors etc. via NCA-ASP to SNDs and Electronic Devices 104 they have installed as well as accessing crowd analytics in a similar manner to insurance provider 170B to enhance their product offerings, offer incentives, etc.

Telecommunications service provider 175B, e.g. Verizon™ and OEM 175C, e.g. General Electric™, may exploit NCA-ASPs to update, upgrade, adjust and/or revise software, features, limits, etc. of SNDs and Electronic Devices 104 associated with them directly or through agreements with other vendors, service providers, third party providers etc. In other instances, a motion sensor triggered external to the front door of a property may not only result in the exterior lights of the property being turned on but video content being streamed to the user and/or their security service provider. If the user has a private calendar with the security service provider, then the event may automatically trigger a security response either in each event or within predetermined time limits or an operator is automatically presented with the video stream to make a determination.

Embodiments of the invention may exploit multiple geofences with respect to a location such that for example, determination that the user's vehicle has entered a first geofence triggers exterior lighting, whilst entering a second geofence triggers the garage door opener and disables that zone of the security system (if covered).

It would be evident that other providers such as utilities may exploit NCA-ASPs to monitor, update, upgrade or adjust SNDs and Electronic Devices 104. For example, an electricity provider may update pricing and consumption tier information within Thermostats 111 or within a database that the Thermostats 111 periodically update from. Further, one or more of these different manufacturers, providers, etc. can combine to provide enhanced control algorithms and control interfaces.

Within the embodiments of the invention presented supra SNDs and/or Electronic Devices 104 establish control settings, operating modes, alarms, triggers etc. based upon a determination that includes the current mode, status, setting, etc. of other SNDs and/or Electronic Devices 104. Within the described embodiments a Cloud Service 103 is employed to link the different SNDs and/or Electronic Devices 104 without requiring wired and/or wireless linking of the SNDs and/or Electronic Devices 104. However, it would be evident that within other embodiments of the invention a first SND and/or Electronic Device 104, such as a Security System 105, may perform a discovery action wherein the identities of other SNDs and/or Electronic Devices 104 within range of the Security System 105 are established. In such an embodiment the Security System 105 may transmit a mode change to all identified SNDs and/or Electronic Devices 104 by direct Internet and/or other network communications. Alternatively, the SNDs and/or Electronic Devices 104 may simply listen for a broadcast mode change by the Security System 105. Optionally, the available range of communications from the Security System 105 may be increased through ad-hoc communications of the SNDs and/or Electronic Devices 104 such that a motion sensor at the periphery of a property may communicate to the Security System 105 via one or more intermediate SNDs and/or Electronic Devices 104 wherein the network routing between Security System 105 and the SNDs and/or Electronic Devices 104 may be dynamic or based upon an initial network/environment discovery mode. A dynamic system or re-initialization of a network/environment discovery mode allows for additional SNDs and/or Electronic Devices 104 to be added without significant overhead to the user. Accordingly, a user may purchase and locate additional SNDs and/or Electronic Devices 204 together with additional elements of the Security System 105, themselves SNDs and/or Electronic Devices 104, and the overall configuration automatically updated either locally and/or via a Cloud Service 103.

Whilst within embodiments of the invention location of a user is considered to be based upon a location determination exploiting GPS, wireless triangulation, "presence" as defined by connection to a predetermined AP etc. it would be evident that other means of determining the location of a user may be employed including, but not limited to, environment disturbance, radar, sonar, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
   a security system associated with an element of infrastructure coupled to a first network and having a plurality of modes;
   a plurality of network-controllable devices associated with the element of infrastructure, each coupled to a second network and having a set of operating states; wherein a change in the mode of the security system results triggers an action with respect to a predetermined subset of the plurality of network-controllable devices.

2. The system according to claim 1, wherein
the action comprises establishing a setting for each network-controllable device within the predetermined subset of the plurality of network-controllable devices.

3. The system according to claim 1, wherein
the action comprises transmitting to each network-controllable device within the predetermined subset of the plurality of network-controllable devices data relating to a setting for that network-compatible device from a remote service, wherein
the remote service is connected to both the first network and the second network.

4. The system according to claim 1, wherein
the first network and the second network are the Internet.

5. The system according to claim 1, wherein
the first network and the second network are the same network comprising a first predetermined wired portion and a second predetermined wireless portion;
the security system at least one of transmits and broadcasts the change in mode of the security system on the network.

6. The system according to claim 1, wherein
each network-controllable device of the plurality of network-controllable devices associated with the element of infrastructure is either directly coupled the second network or coupled to the second network via at least another network-controllable device of the plurality of network-controllable devices.

7. The system according to claim 1, wherein
the plurality of network-controllable devices are the second network and establish the second network as an ad-hoc network.

8. The system according to claim 1, wherein
each network-controllable device of the plurality of network-controllable devices may be directly controlled from at least one of a portable electronic device and a fixed electronic device, wherein the at least one of the portable electronic device and the fixed electronic device is other than the security system.

9. The system according to claim 1, wherein
the triggered action relates to a setting of the network-controllable device of the plurality of network-controllable devices, wherein the setting is established in dependence upon crowd sourcing data relating to the network-controllable device of the plurality of network-controllable devices.

10. The system according to claim 1, wherein
the triggered action is established in dependence upon at least one of a rule and an algorithm at least one of stored upon and executed by a remote server coupled to a network which is at least one of connected to and partly formed by each of the first network and the second network.

11. The system according to claim 1, wherein
the triggered action is established in dependence upon the change in the mode of the security system and the current settings of the predetermined subset of the plurality of network-controllable devices.

12. The system according to claim 1, wherein
the change in the mode of the security system is established in dependence upon the location of an individual with respect to a plurality of geofences established with respect to the element of infrastructure.

13. The system according to claim 1, wherein
The triggered action is established in dependence upon the change in the mode of the security system and the location of an event associated with the security system leading to the change in the mode.

* * * * *